United States Patent [19]

Mink

[11] 4,293,268
[45] Oct. 6, 1981

[54] MATERIAL HANDLING DEVICE

[76] Inventor: George Mink, 38296 Horseshoe Dr., Mt. Clemens, Mich. 48043

[21] Appl. No.: 77,678

[22] Filed: Sep. 21, 1979

[51] Int. Cl.³ .............................................. B65G 47/90
[52] U.S. Cl. ................................. 414/591; 414/744 A
[58] Field of Search ............... 414/744 R, 744 A, 590, 414/591, 738, 739, 1, 4, 7

[56] References Cited

U.S. PATENT DOCUMENTS

| | | | |
|---|---|---|---|
| Re. 29,797 | 10/1978 | Mink | 414/739 |
| 3,963,271 | 6/1976 | Sugino et al. | 414/744 A X |
| 4,027,767 | 6/1977 | Gluck | 414/744 R X |
| 4,036,374 | 7/1977 | Woltjen | 414/591 |
| 4,139,104 | 2/1979 | Mink | 414/744 A |

*Primary Examiner*—James L. Rowland
*Attorney, Agent, or Firm*—Harness, Dickey & Pierce

[57] ABSTRACT

Several embodiments of material handling devices for moving a workpiece through a predetermined path. Each embodiment includes a gripping device for holding the workpiece and a supporting structure for permitting movement of the gripping device along two separate paths. A cam arrangement is also provided that includes at least one barrel cam and a second cam, both of which are fixed to a common shaft. Separate follower arrangements cooperate with each cam and operate to move the gripping device along each path of movement. In two embodiments, two barrel cams are employed. As a safety feature, an overload device is incorporated so that the mechanism will not be damaged in the event of jamming.

8 Claims, 19 Drawing Figures

MATERIAL HANDLING DEVICE

BACKGROUND OF THE INVENTION

This invention relates to a material handling device and more particularly to improved high speed material devices.

Many applications demand a device which can be used to automatically move a workpiece from one location to another. Examples of such devices may be found in my earlier U.S. Pat. No. 3,972,422, entitled "Material Handling Apparatus", issued Aug. 3, 1976; U.S. Pat. No. 4,139,104, entitled "Material Handling Apparatus", issued Feb. 13, 1979; and U.S. Pat. No. 4,002,245, entitled "Material Handling Apparatus Having Gripping Means for Moving Articles in Several Directions", issued Jan. 11, 1977 (now U.S. Pat. No. RE 29,797, reissued Oct. 10, 1978). Each of these devices is particularly adapted to grip a workpiece at one location, to move it to another location and subsequently release it. Although these devices are particularly well adapted for this purpose, it is an object of this invention to provide a material handling device that is more rapid in operation and which provides a greater latitude in the path of movement.

SUMMARY OF THE INVENTION

This invention is adapted to be embodied in a material handling device for moving a workpiece. The device includes gripping means for selectively gripping a workpiece to be moved. First supporting means support the gripping means for movement along a first path and second supporting means support the gripping means for movement along a second path. A camshaft is supported for rotation and a barrel cam is affixed for rotation with the camshaft as is a second cam. A first follower is supported for oscillation about an axis that is dispositioned transversely to the axis of the camshaft and is engageable with the barrel cam for oscillation upon rotation of the camshaft. A second follower is engaged with the second cam and is movable upon rotation of the camshaft. First motion transfer means translates oscillatory movement of the first follower about its axis into movement of the gripping means along the first path. Second motion transfer means translates movement of the second follower into movement of the gripping means along its second path.

BRIEF DESCRIPTION OF THE DRAWINGS

FIG. 7 is a top plan view of a material handling device constructed in accordance with a second embodiment of the invention.

FIG. 18 is a cross sectional view taken along the line 18—18 of FIG. 15.

DETAILED DESCRIPTION OF THE PREFERRED EMBODIMENTS

EMBODIMENT OF FIGS. 1 THROUGH 6

In these figures, the reference numeral 11 indicates generally a material handling device constructed in accordance with a first embodiment of this invention. The material handling device 11 includes a driving motor 12, a cam and follower arrangement 13, a supporting structure 14 and a workpiece gripping device 15. As will become apparent, the elements are constructed so that the workpiece gripping device 15 is moved along a predetermined path.

Figure 1:
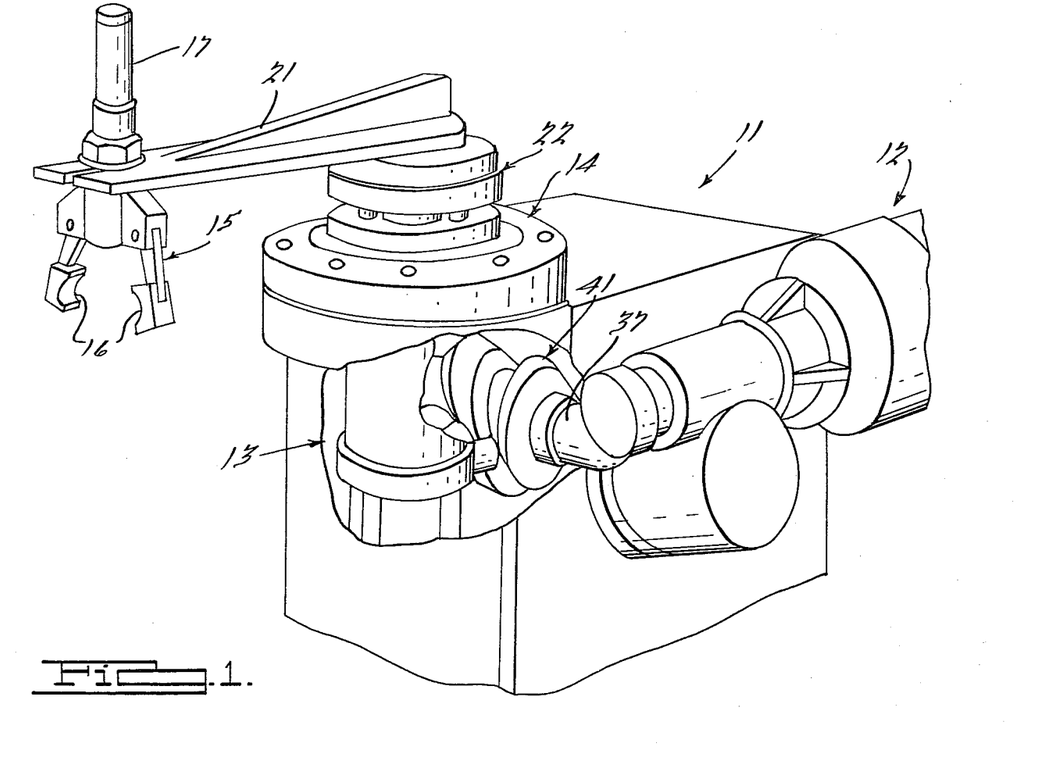
FIG. 1 is a perspective view of a material handling device constructed in accordance with a first embodiment of the invention, with portions broken away to more clearly show the construction.
Figure 2:
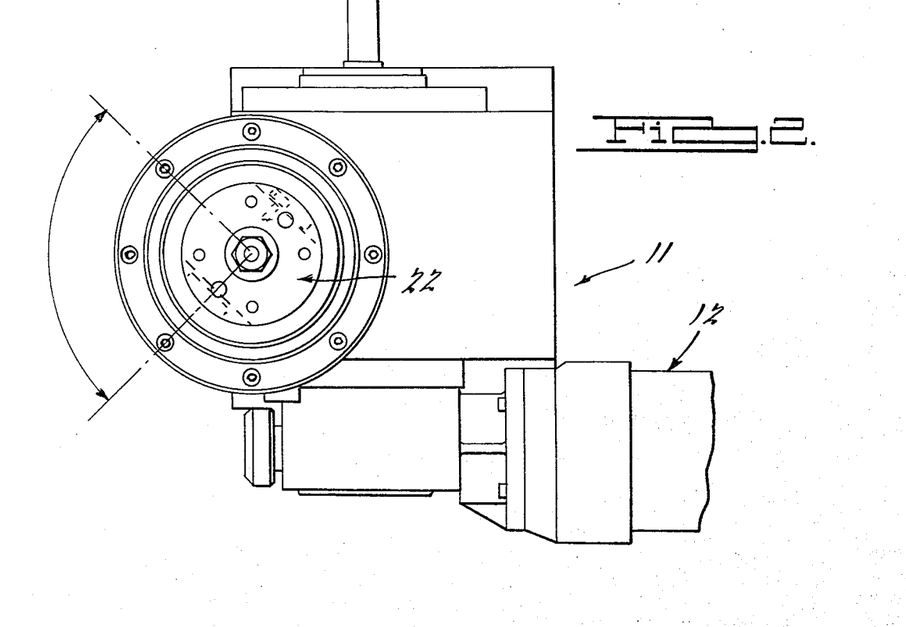
FIG. 2 is a top plan view of the embodiment of FIG. 1 with the gripping means and its supporting arm removed so as to more clearly show certain portions of the construction.

The workpiece gripping device 15, which is only shown in FIG. 1, includes a pair of pivotal jaws 16 that are actuated between an opened, released position and a closed, gripping position, by means of an actuating cylinder 17. The gripping device 15 may be of any of the known types of devices generally on the market.

The gripping device 15 is affixed in any desirable orientation at the outer end of a supporting arm 21, which also is only shown in FIG. 1, and which forms a movable portion of the supporting structure 14. The arm 21 is affixed in any known manner to a disc assembly, indicated generally by the reference numeral 22 and shown in most detail in FIG. 6. The disc assembly 22 carries a pair of depending guide pins 23 and 24 which are held in place by means of clamp plates 25 and 26, respectively.

The pins 23 and 24 are suitably supported for axial movement in pairs of bushings 27, 28 which are, in turn, affixed to a generally cylindrical supporting assembly 29. The supporting assembly 29 is in turn rotatably journalled within the upper wall of a housing assembly 31 by means of an antifriction bearing 32. It should thus be clear that the disc 22 is supported for rotation by the assembly 29 and bearings 32 and is axially slidable relative to the assembly 29 by virtue of the bushings 27, 28. The control over the rotary and axial movement of the disc 22 and, accordingly, the gripping device 15 supported thereby is afforded by means of the cam and follower assembly 13.

Figure 3:
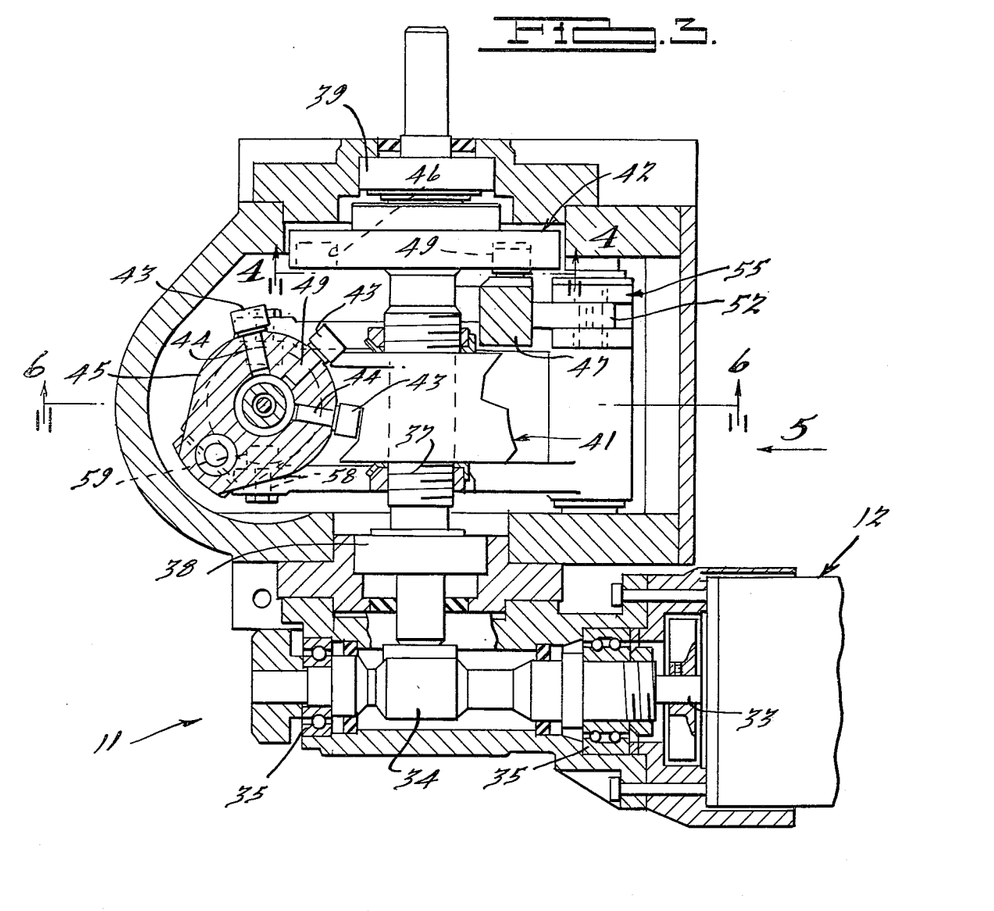
FIG. 3 is an enlarged cross sectional view taken along a plane parallel to that of FIG. 2 and generally through the axis of the camshaft.
Figure 4:
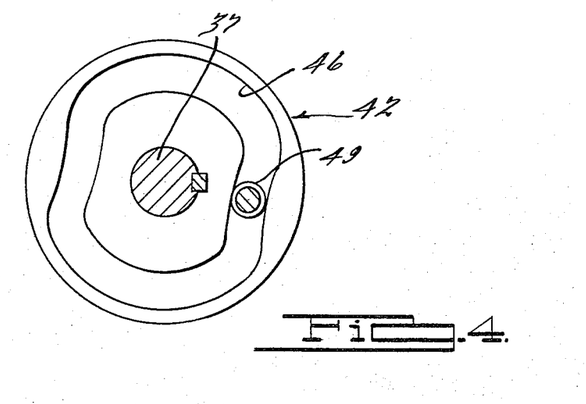
FIG. 4 is a cross sectional view taken along the line 44 of FIG. 3.
Figure 5:
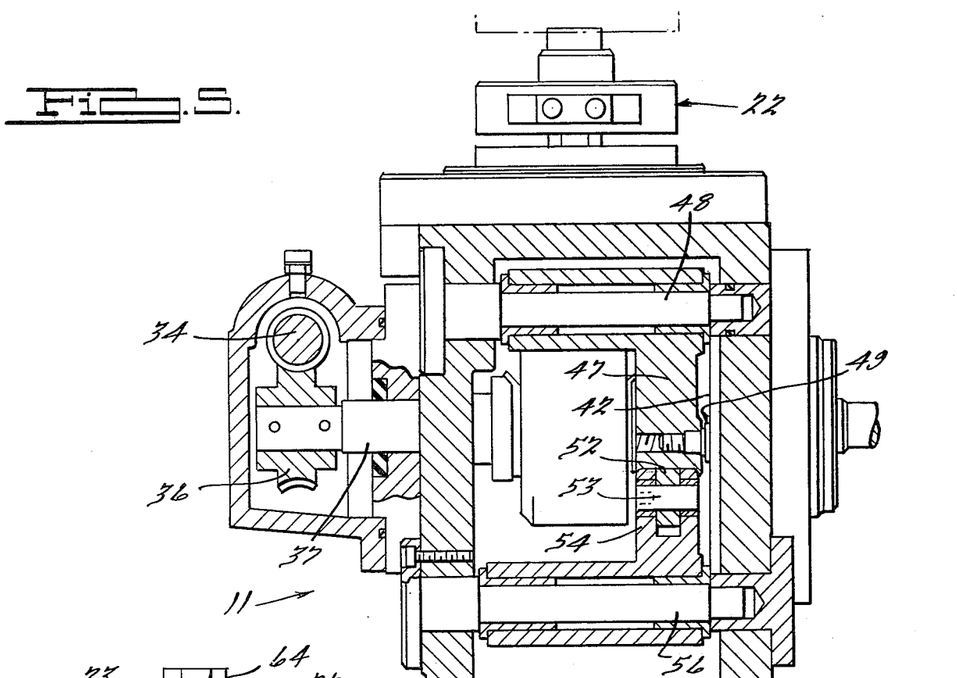
FIG. 5 is an elevational view, with portions shown in cross section, taken generally in the direction of the arrow 5 in FIG. 4.
Figure 6:
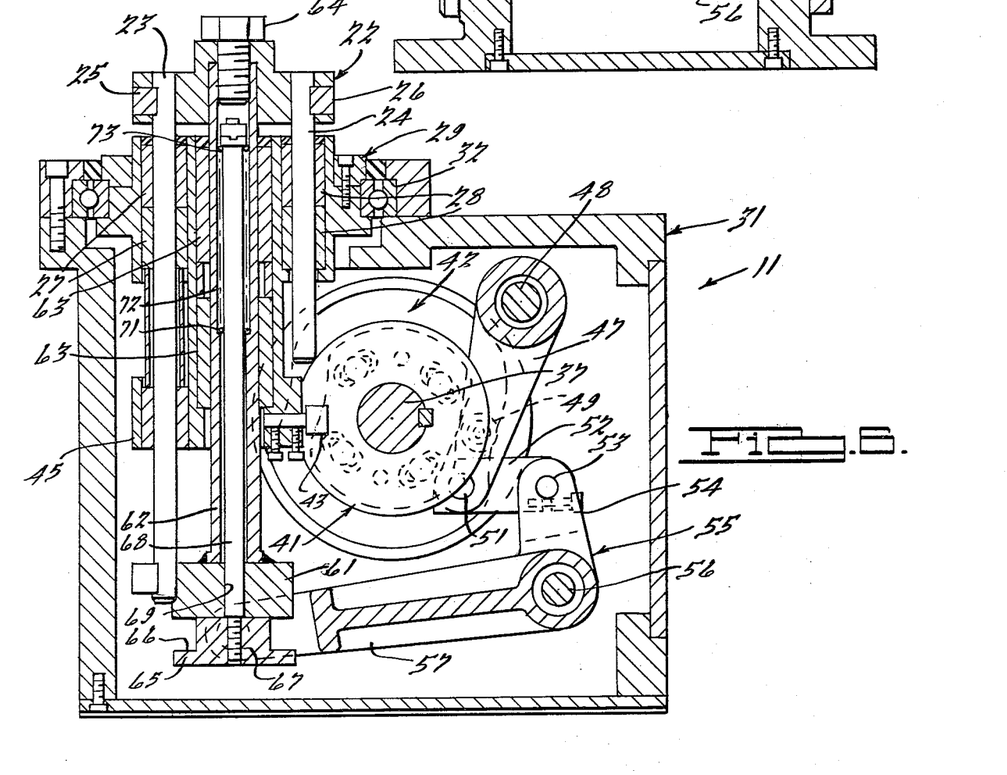
FIG. 6 is a cross sectional view taken along the line 66 of FIG. 3.

Referring to this portion of the construction, the drive motor 12 has an output shaft 33 which is drivingly coupled to a worm gear 34 which is journalled in spaced bearings 35 (FIG. 3). The worm gear 34 is enmeshed with a worm wheel 36 that is fixed in a suitable manner to a camshaft 37. The camshaft 37 is journalled in the housing 31 in any suitable manner, as by means of spaced bearings 38 and 39. Between the bearings 38 and 39, two cams are affixed for rotation with the camshaft 37. These cams include a barrel cam, indicated generally by the reference numeral 41 and a face cam, indicated generally by the reference numeral 42. The barrel cam 41 controls the rotational or oscillatory movement of the gripping device 15 while the face cam 42 controls the axial or up and down movement of the gripping device 15.

A plurality of roller followers 43 are journalled on pins 44 which extend radially from an annular collar 45 formed on the lower end of the supporting assembly 29. The roller followers 43 coact with the barrel cam 41 and cause an oscillation of the supporting assembly 29, disc 22, arm 21 and gripper assembly 15 upon rotation of the barrel cam 41. The barrel cam 41 is configured so that during a given cycle of operation the supporting assembly 29 and the aforenoted components and particularly the gripper 15 will dwell at a first angular position, rotate to a second angular position, go through a dwell stage and then return back to the first angular position. This cycle of operation is achieved during a single rotation of the camshaft 37. Alternative cycles of operation are believed obvious to those skilled in the art as is how such variations in cycle can be achieved.

The face cam 42 has a cam groove 46 formed in the face adjacent the barrel cam 41. A lever 47 is journalled between the two cams 41 and 42 on a shaft 48 that is affixed in any suitable manner to the housing 31. Intermediate its ends, the lever 47 carries a roller follower 49 that is received in the cam groove 46 so as to cause oscillation of the lever 47 about the shaft 48 upon rotation of the cam shaft 37.

At the lower end of the lever 47, a pin 51 connects the lever 47 to a link 52. The opposite end of the link 52 is pivotly connnected by a pivot pin 53 to an upstanding bifurcated arm 54 of a bell crank, indicated generally by the reference numeral 55. The bell crank 55 is, in turn, pivotly supported by the housing 31 upon a pivot shaft 56. The bell crank 55 has a second bifurcated arm 57 the terminal ends of which carry inwardly extending pins 48 which journal rollers 59. The rollers 59 engage the underside of a collar 61. The collar 61 is, in turn, affixed to the lower end of a tube 62 that extends through the center of the supporting assembly 29 and which is guided for axial movement therein by means of a pair of bushings 63. The upper end of the tube 62 is affixed to the disc 22 by means of a machine screw 64.

A hub like member 65 is juxtaposed to the lower end of the collar 61 and defines a horizontally extending shoulder 66 so that rollers 59 are normally trapped between the shoulder 66 and the collar 61. The hub like member 65 is threaded to a reduced diameter threaded end 67 of a rod 68 that extends through a bore 69 in the collar 61 end through the interior of the tubular member 62. The central bore of the tube 62, is formed with a shoulder 71 near its mid point. A coil compression spring 72 engages the shoulder 71 at its lower end and a stop nut 73 that is affixed to the upper end of the rod 68. As will become apparent, the spring 72 serves to permit the rod 68 to move downwardly without exerting any positive force upon the arm 21 and gripper assembly 15 for safety reasons.

The operation of the embodiment of FIGS. 1 through 6 will now be described. The motor 12 is driven either continuously or cyclicly through a single rotation of the camshaft 37. FIG. 1 illustrates the mechanism in a home position. In this position, the gripper jaws 16 will be opened and a workpiece can be positioned in proximity to them to be gripped in any suitable device. The cylinder 17 is then actuated so as to close the jaws 16 and grip the workpiece. As the camshaft 37 rotates the barrel cam 41 will be in its dwell position and the arm 21 will be in a first angular position. Considering that the camshaft 37 rotates in a clockwise direction as viewed in FIG. 6, the configuration of the face cam groove 46 will cause the follower 49 to be urged to the right pivoting the lever 47 in a counterclockwise direction. This rotation is transmitted through the link 52 so as to cause the bellcrank 55 to be rotated about its supporting shaft 56 in a clockwise direction. The rollers 59 will engage the underside of the collar 61 and urge the end of the tube 62 upwardly. During this upward movement, the hub like member 65 will also be raised due to the action of the spring 72. This lifting movement continues until the face cam groove 46 reaches its dwell position.

During this lifting movement the disc 22 and pins 23 and 24 will move upwardly through the axial journalled relationship with the supporting assembly 29. Thus, the workpiece gripped by the gripping assembly 15 will be raised. Upon continued rotation of the camshaft 37, the barrel cam 41 will then cause rotation of the entire assembly through its coaction with the followers 43. Since the disc 22 is effectively keyed to the supporting assembly 29 through the action of the pins 23 and 24, the arm 22 and gripping assembly 15 will rotate from their first angular position to their second angular position. At the completion of this movement, the follower 49 will then move out of the dwell portion of the face cam groove 46 and the lever 47 and bellcrank 55 will again be pivoted to effect lowering of the arm 22 and gripping assembly 15. As has been noted this lowering movement is done by gravity and if the arm 21 or gripping assembly 15 are obstructed from downward movement, the spring 72 will merely yield. At this point the cylinder 17 can then be actuated so as to release the held workpiece from the jaws 16.

The lowering movement aforedescribed occurs during another dwell cycle of the face cam 41. At the completion of the lowering operation, the face cam 41 again causes the followers 43 to pivot, but this time in in the opposite direction, so that the arm 21 will be rotated back to its home position.

As has been previously noted, the cycle of operation can be changed by changing the configuration of the grooves of the face cam 42 and the barrel cam 41. Furthermore, the opening and closing of the jaws 16 and, if desired, starting and stopping of the motor 12 may be controlled in any known manner through the use of limit switches.

Embodiment of FIGS. 7 through 14

A second embodiment of this invention is illustrated in FIGS. 7 through 14 and is identified generally by the reference numeral 101. Material handling device 101 is generally similar to that of the preceding embodiment, however, this embodiment incorporates two barrel cams for accomplishing the motion in each path of movement. In addition, a different type of overload release mechanism is employed and in this embodiment both paths of movement are rectilinear.

The material handling device 101 includes a driving motor 102 a cam and follower arrangement 103, a supporting structure 104, and a gripping device 105. The gripping device 105 includes a pair of pivotly supported jaws 106 that are operated between an opened position and a gripping position in any known manner such as by means of pneumatically operated cylinder 107. The gripping device 105 is suitably fixed to the end of an arm 108 and may be supported by this arm in any chosen orientation.

The arm 108 is affixed to a pair of rods 109 which are in turn slidably supported for movement by the supporting mechanism as will now be described. The rods 109 are slidably supported by means of bushings (not shown) formed in a carriage assembly, indicated generally by the reference numeral 111. The carriage assembly 111 has horizontally extending bores 112 through which the rods 109 extend. The carriage assembly 111 further has vertically extending bores in which bushings 113 are provided for slidably supporting the carriage assembly for movement in an up and down direction upon a pair of rods 114 that are affixed to the top and bottom walls of a housing 115 of the supporting assembly 104. It should be apparent, therefore, that the carriage 111 is supported for vertical up and down movement on the rods 114 and that the rods 109 are slidably supported for in and out movement by the carriage 111 as well as moving vertically with it.

Figure 8:
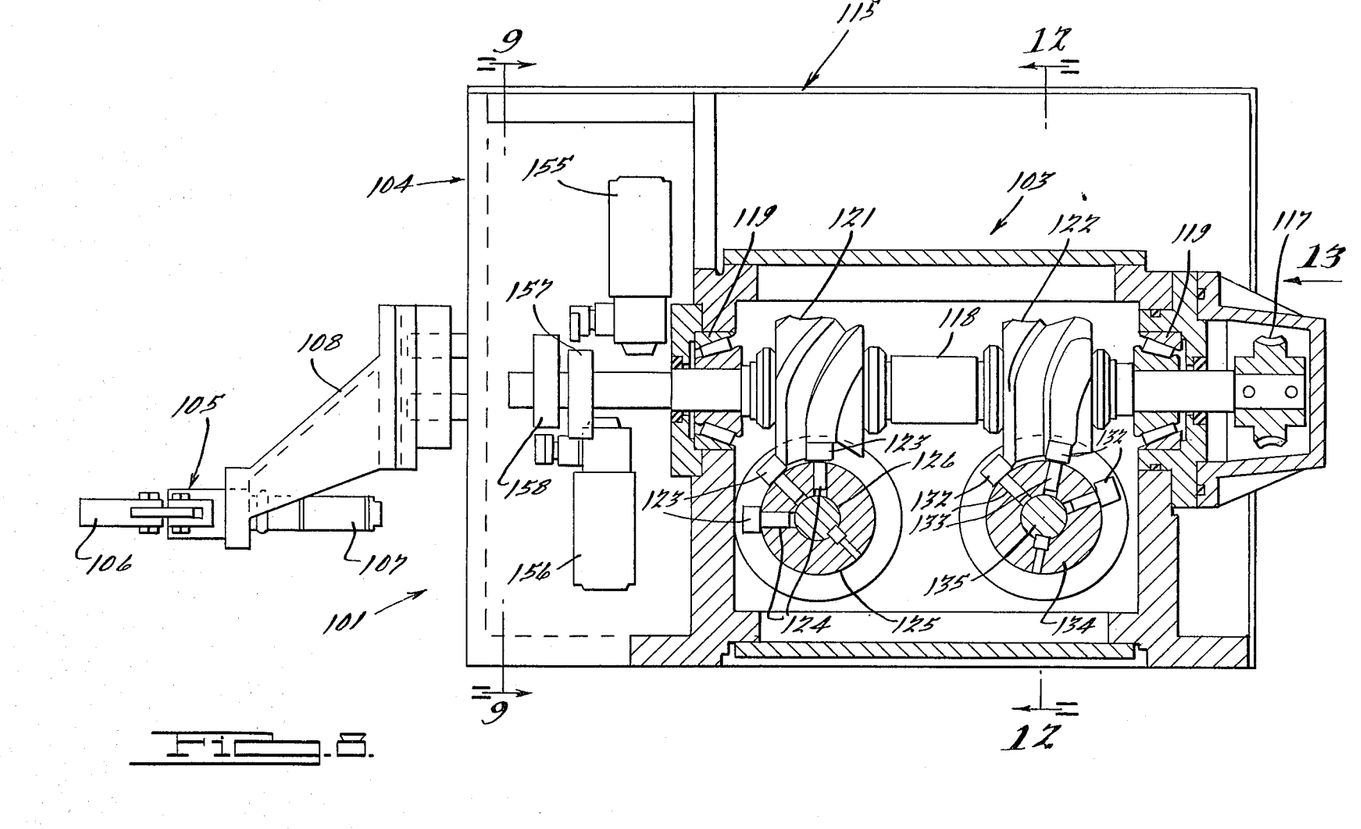
FIG. 8 is a cross sectional view of the embodiment shown in FIG. 7 and is taken generally along the line 88 of FIG. 7.
Figure 9:
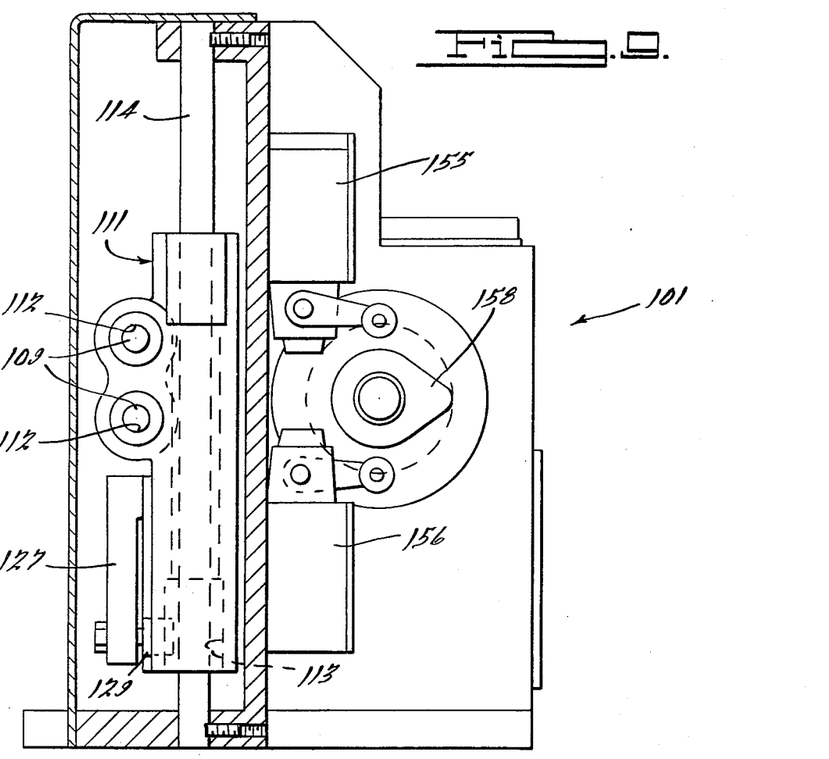
FIG. 9 is a cross sectional view taken along the line 99 of FIG. 8.

The mechanism for moving the carriage 111 and rods 109 and the gripping mechanism 105 supported thereby includes the driving motor 102. The output shaft of the driving motor carries a worm gear 116 (FIG. 7) that is meshed with a worm wheel 117 that is affixed to a cam shaft 118. The cam shaft is, in turn, supported in the housing 115 by means of a pair of spaced bearings 119 (FIG. 8). Affixed to the camshaft 118 between the bearings 119 is a first barrel cam 121 and a second barrel cam 122.

A follower and motion transmitting mechanism cooperates with the barrel cam 121 for effecting vertical movement of the carriage 111 and gripping device 105. This includes a plurality of roller followers 123 that are supported on shafts 124 which are, in turn, carried by a supported collar 125. The supporting collar is carried by the housing 115 for oscillatory movement upon a shaft 126. The shaft 126 is coupled to an arm 127 by means of an overload release device, indicated generally by the reference numeral 128. The overload release device 128 associated with the followers 123 is not shown in detail but is the same as that associated with the barrel cam 122, which will be described in more detail.

The outer end of the arm 127, a pin 129 is carried which is received in a groove formed by a bearing block 121 that is fixed with the carriage 111. Thus, oscillatory movement of the arm 127 about the axis defined by the shaft 126 will cause the carriage 111 and gripping device 105 carried thereby to be moved vertically.

A plurality of roller followers 132 are associated with the barrel cam 122. The roller followers are supported upon pins 133 which are fixed to a collar 134 that is, in turn, affixed to a shaft 135. The shaft 135 is, in turn, journalled in the housing 115 by means of spaced antifriction bearings 136. As has been noted a similar arrangement is used for supporting the collar 125.

A disc 137 having a plurality of pockets 138 is affixed to the shaft 135. Balls 139 are urged into engagement with the pockets 138 by means of compression springs 141 so as to form an overload release driving connection between the 137 and a hub 142 formed integrally with an arm 143. The preload on the springs 141 is set by means of screws 144.

Figure 14:
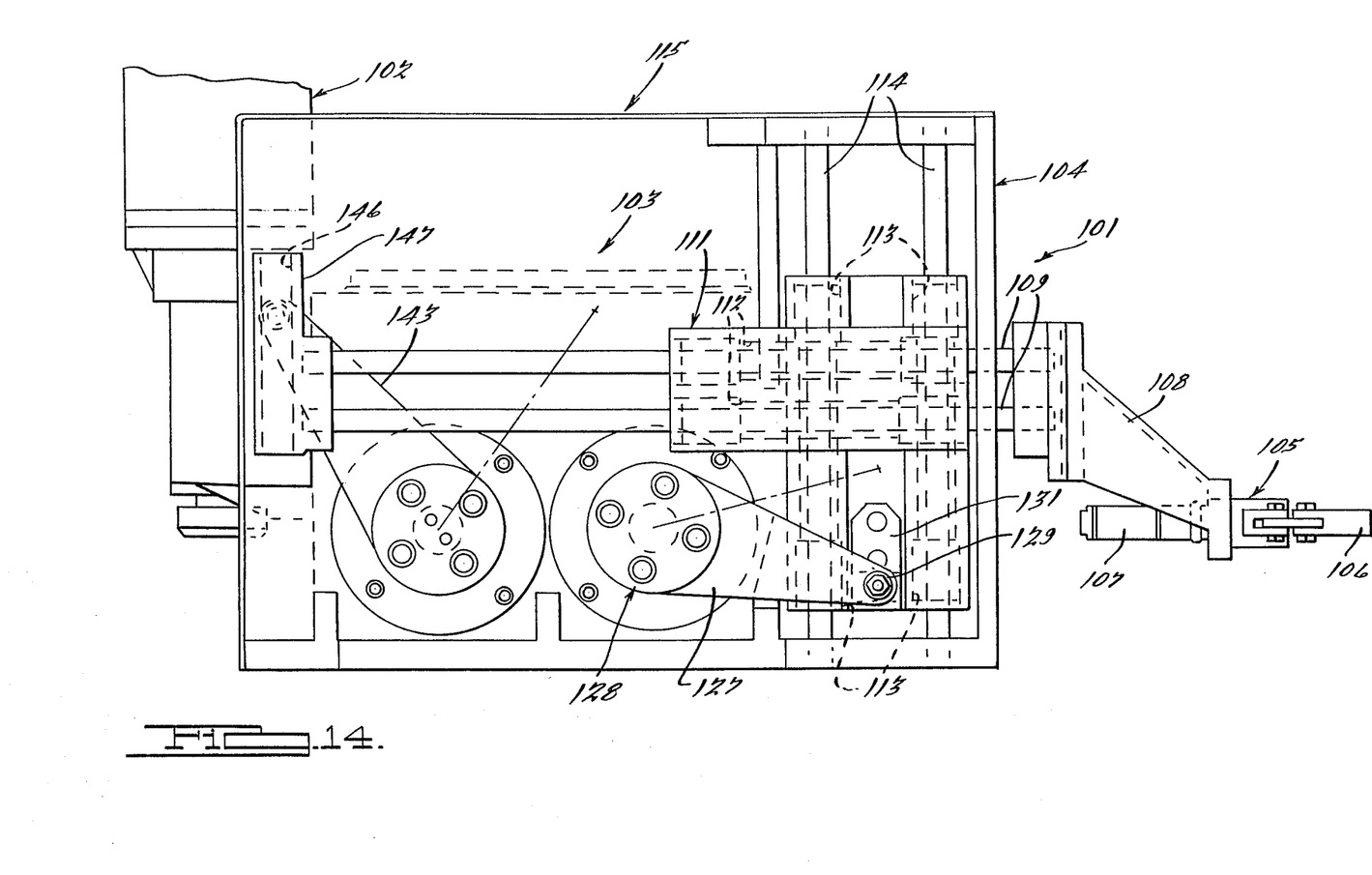
FIG. 14 is a side elevational view with the cover plate removed taken generally in the direction of the arrow 14 in FIG. 12.
Figure 15:
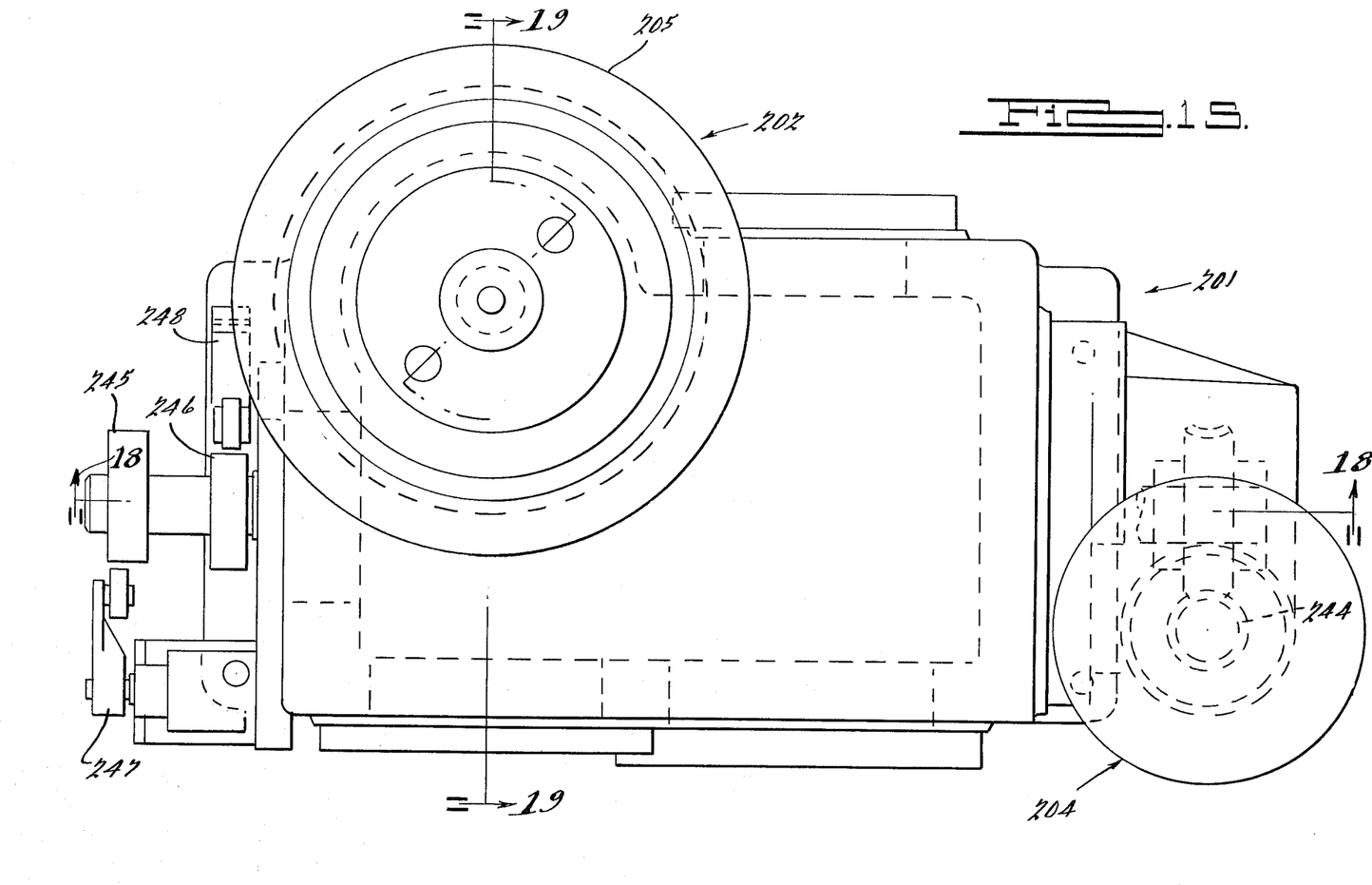
FIG. 15 is a top plan view of a material handling device constructed in accordance with a third embodiment of this invention, with the gripping means removed to more clearly show the construction.

A roller follower 145 is carried at the outer end of the arm 143 and is engaged in a slot 146 formed in a block 147. The block 147 is, in turn, affixed to the inner ends of the rods 109 (FIG. 14). It should be apparent that oscillation of the shaft 135 about its axis results in pivotal movement of the arm 143 so as to reciprocate the rods 109 back and forth in the carriage 111. The elongation of the slot 146 in which the follower 145 is received permits this reciprocatory movement regardless of the vertical position of the carriage 111.

Figure 10:
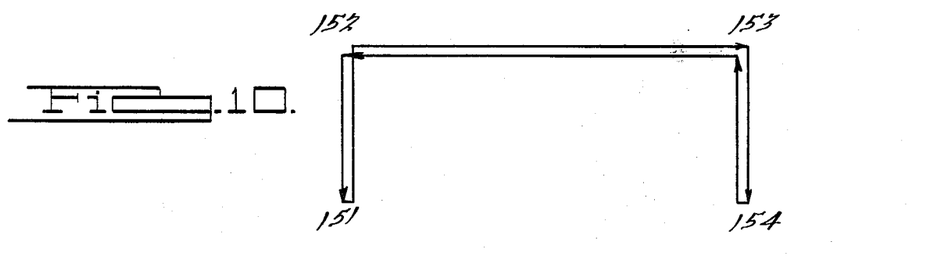
FIG. 10 is a schematic view showing one possible path of movement of the embodiment of FIGS. 7 through 9.
Figure 11:
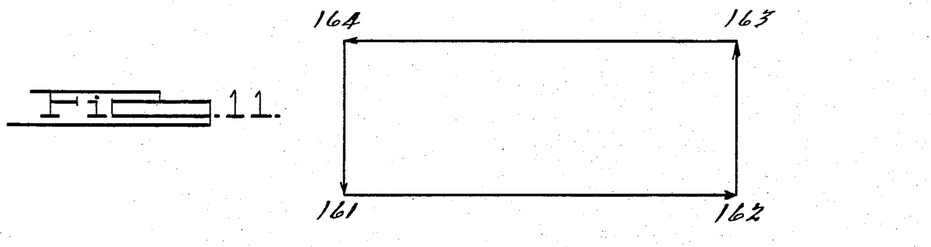
FIG. 11 is a schematic, in part similar to FIG. 10, and shows another possible path of movement of this embodiment.
Figure 12:
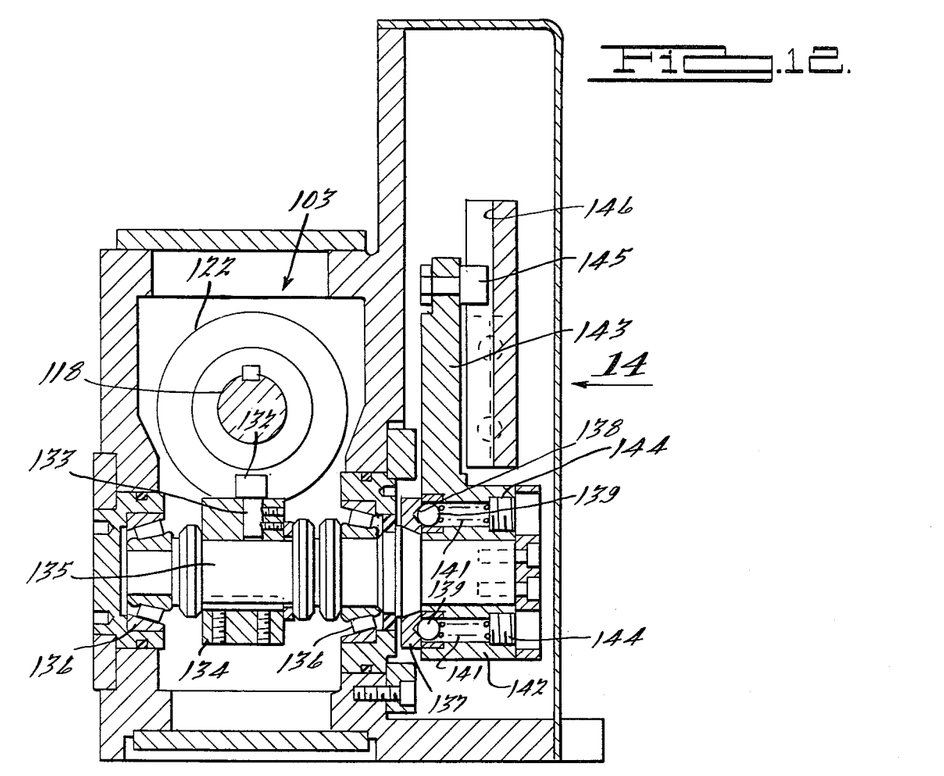
FIG. 12 is a cross sectional view taken along the line 12—12 of FIG. 8.
Figure 13:
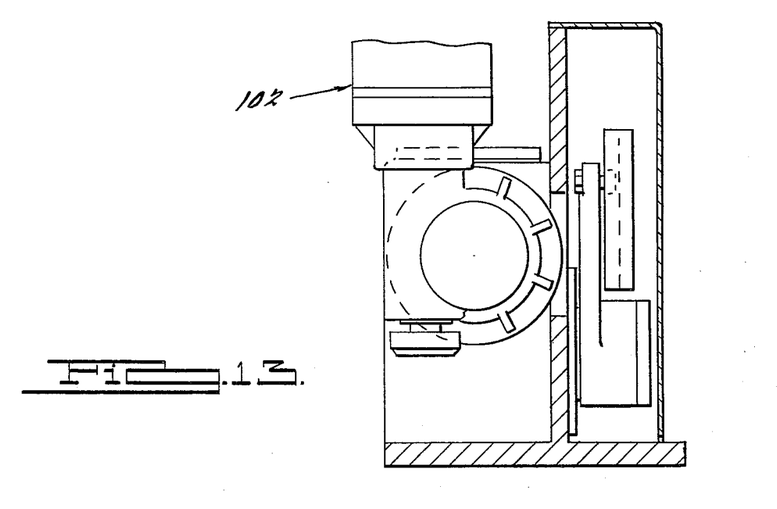
FIG. 13 is an end elevational view, with portions shown in cross sectional, taken generally in the direction of the arrow 13 in FIG. 8.

As with the preceding embodiment, a path of movement of the gripping device 105 will depend upon the configuration of the cams 121 and 122. Two possible paths of movement are shown in FIGS. 10 and 11. Considering first the path in accordance with FIG. 10, home position is indicated by the point 151. With the camshaft 118 rotating at this point, the cam 122 is in a dwell position so that the followers 132 will not be actuated. The cam 121, on the other hand, is in a driving position and causes rotation of the overload release mechanism 128 and follower arm 127 in a counterclockwise direction as shown in FIG. 14. The gripping device 105 which may have previously been actuated so as to grip a work piece at the station 151 is then lifted by the movement of the carriage 111 along the rods 114 to the position 152. The cam 121 then reaches a dwell position and the cam 122 reaches its driving position. When this occurs, the carriage 111 is maintained in its upper position and the cam 122 effects rotation of the arm 143 in a clockwise direction as shown in FIG. 14. This effects sliding of the rods 119 in the carriage 111 to an outer position as indicated by the point 153. As has been noted, this movement of the rods 109 is possible when the carriage 111 is in its elevated position due to the length of the slot 147 in which the follower 148 is received.

When the carriage and gripping device 105 reaches the point 153, the cam 122 goes into its dwell position and the cam 121 again reactivates to rotate the arm 127 in a clockwise direction as shown in FIG. 14 so as to lower the carriage 111 and the gripping device 105 to the position 154. At this point, the jaws 106 are released and the workpiece will be deposited at the point 154. The gripping device 105 is then moved to its home position following the path through points 154 to 153 to 152 to 151.

The aforenoted sequence of operation may also be accompanied by actuation of suitable switches, such as the switches 155 and 156 by means of cams 157 and 158 affixed to the camshaft 118. It is believed obvious to those skilled in the art how such an arrangement may be employed. The switch 155 and 156 may control the gripping device 105 and motor 102, for example.

FIG. 11 shows another possible sequence of operation. In this case, the cams 121 and 122 are configured so that the gripping device 105 will be first moved from a home position 161 horizontally to a position 162 by the cam 122, is raised to the point 163 by the operation of the cam 121, is moved to the position 164 by the cam 122 and then is lowered to the point 161 by the cam 121. Again, suitable limit switches for other timing devices may be incorporated for appropriately actuating the gripping device 105 and for controlling the motor 102.

As has been noted, overload release devices incorporated between each shaft 126 and 135 and the element driven thereby, (either the carriage 111 or the rods 109). These overload release devices also may be of the type shown in my copending patent application serial number 19910, filed Mar. 12, 1979, and entitled "Overload Release Mechanisms". If an obstacle is encountered which prevents further movement, the balls 139 will be urged outwardly against the action of the springs 141 so as to permit rotation of the shaft from being transmitted to pivotal movement of the respective arm 127 or 143. Upon removal of this obstacle, the device will reengage.

Embodiment of FIGS. 15 Through 19

A material handling device constructed in accordance with a third embodiment of this invention is identified generally by the reference numeral 201. The material handling device 201 has certain features which are common to the earlier described embodiments. For example, in this embodiment the gripping device and associated held workpiece is oscillated about an axis and is moveable in a reciprocatory fashion along an axis parallel to that axis as was the embodiment of FIGS. 1 through 6. Like the embodiment of FIGS. 7 through 14, the material handling device 201 employs two barrel cams.

The material handling device 201 includes a gripping device and supporting arm as in the previously described embodiments. Such a device has not been illustrated in FIGS. 15 through 19 but may take the same form and have the same supporting arrangement as shown in FIGS. 1 through 6. A supporting mechanism 202 is incorporated for providing the support for the gripping device. A cam and follower mechanism, indicated generally by the reference numeral 203 is also incorporated for providing the desired path of movement. The cam and follower mechanism 203 is operated by means of a drive motor, indicated generally by the reference numeral 204.

The gripping device and arm are affixed to a disc 205 in a manner as described in conjunction with the embodiments of FIGS. 1 through 6. Affixed to the disc 205 are a pair of downwardly extending pins 206 and 207. The pins 206 and 207 are slidably supported in a supporting housing, indicated generally by the reference numeral 208, by a pair of spaced bushings 209 and a single bushing 211, respectively.

The supporting housing 208 is rotatably supported by an antifriction bearing 212 within an outer housing 213 of the assembly.

A central post 214 is also affixed to the disc 205 and is slidably supported by the housing 208 by means including a bushing 215. A collar 216 is affixed to the lower end of the post 214 as is a further collar 217 to provide a circumferential groove 218.

Figure 16:
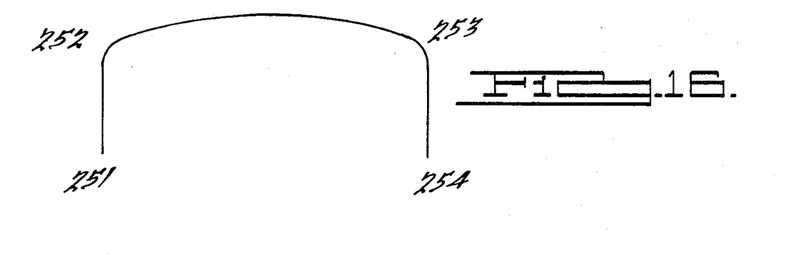
FIG. 16 is a schematic view showing a path of movement of the embodiment of FIG. 15.
Figure 17:
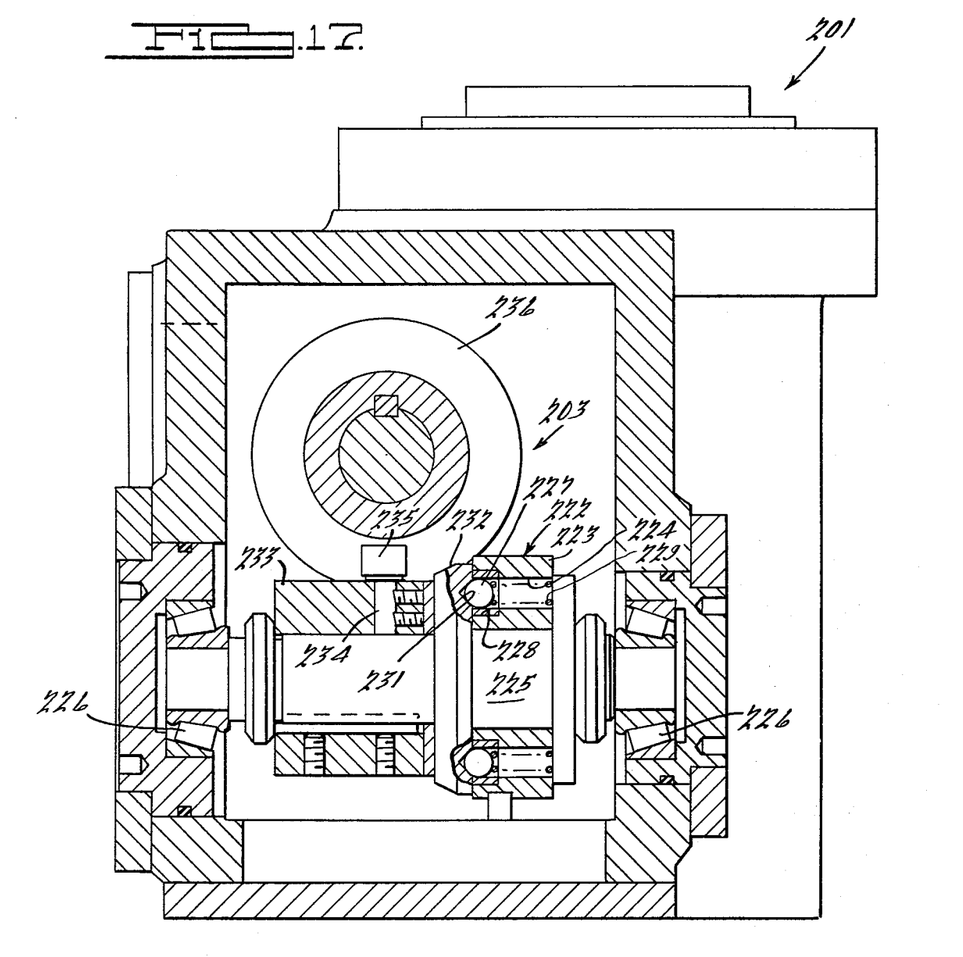
FIG. 17 is a cross sectional view taken generally along the line 17—17 of FIG. 18.
Figure 19:
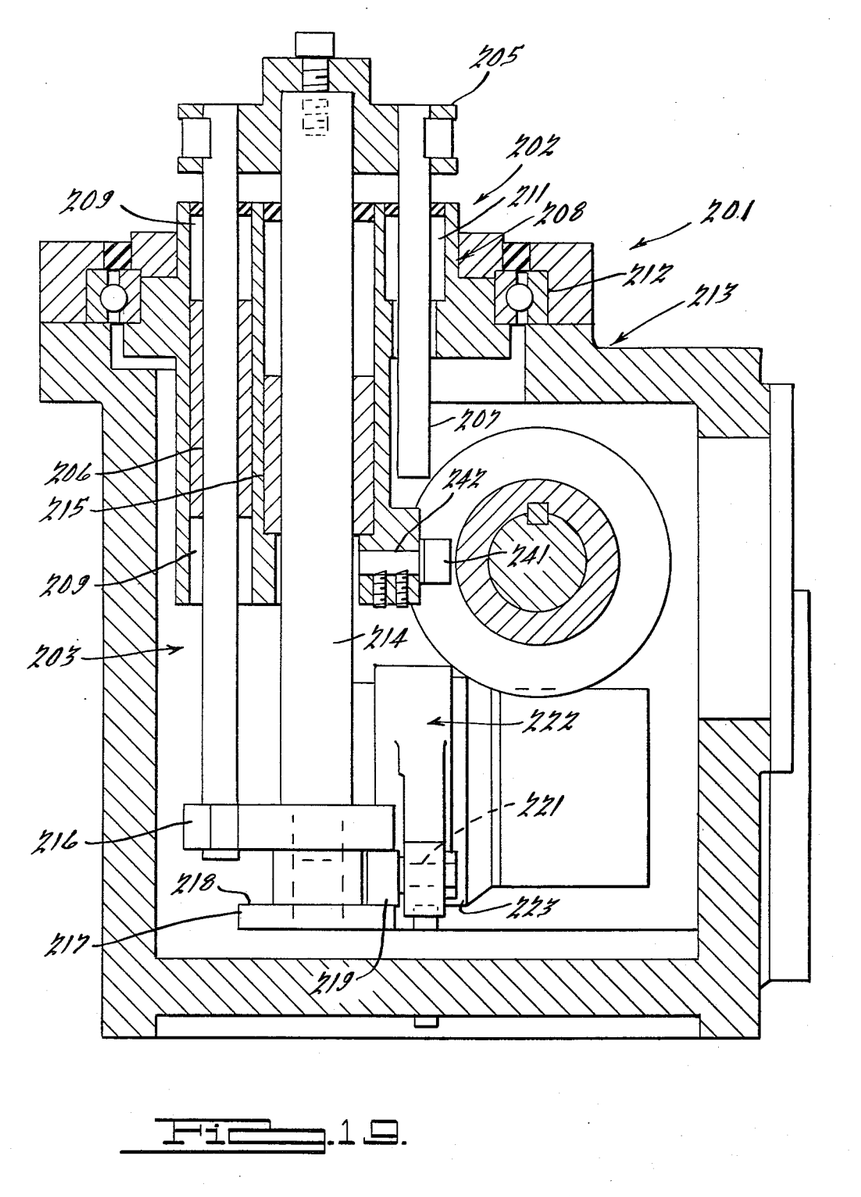
FIG. 19 is a cross sectional view taken along the line 19—19 of FIG. 15.

A roller 219 is received in the groove 218 and is supported upon a shaft 221 that is affixed to the outwardly extending portion of an arm assembly 222. The arm assembly 222 has a hub portion 223 that is journalled upon a shaft 225 which is, in turn, journalled in the housing 213 by spaced anti-friction bearings 226 (FIG. 16).

The hub portion 223 is formed with axially extending bores 224 which terminate in counterbores 228 in which balls 227 are received. Compression springs 229 urge the balls 227 into pockets 231 formed by a disc 232 that is affixed to a hub 233. Thus, an overload release connection is afforded between the hub 223 and the arm assembly 222 as in the similar components of the embodiment of FIGS. 7 through 14.

Pins 234 are affixed to the hub 233 and carry roller followers 235 at their outer ends. The foller followers 235 are adapted to coact with a first barrel cam 236 to effect oscillation of the arm assembly 222 about the axis defined by the shaft 225.

The barrel cam 236 is affixed to a camshaft 237 which is journalled in the housing 213 by spaced bearings 238. A second barrel cam 239 is also affixed to the camshaft 237. Roller followers 241 (FIG. 19) carried on pins 242 coact with the second cam 239. The roller followers 241 and pins 244 are carried by the lower end of the supporting housing 208 so that operation of the barrel cam 239 and followers 241 will effect oscillation of the housing 208 about the axis defined by the bearing assembly 212.

The cam shaft 237 has affixed to its outer end a worm wheel 243. The worm wheel 243 is driven by a worm 244 which is, in turn, affixed to the output shaft of the motor 204.

Cams 245 and 246 may be affixed to the outer end of the cam shaft 237 to coact with limit switches 247 and 248, respectively, so as to control the cycle of operation.

As with the preceding embodiments, any desired path of movement may be achieved with this mechanism depending upon the configuration of the barrel cams 236 and 239. FIG. 16 shows one possible path of movement. In accordance with this path, the gripping device is normally in a home position 251. In this home position, the remainder of the device is as shown in the figures. Assuming the cam shaft 237 is then rotated, the cam 236 will rotate the arm assembly 222 which in turn causes lifting of the post 214 and attached disc 205 to the point 252. While this occurs, the barrel cam 239 is in its dwell position and there will be no oscillation or rotation of the housing assembly 208 about its axis. When the point 252 is reached, the cam 236 will enter a dwell state and the cam 239 will commence its driving movement. The supporting housing 208 and the arm and gripper supported thereby are, then, rotated to the position 253. When the position 253 is reached, the cam 259 again enters a dwell stage and the cam 236 will cause the disc 204 to be moved axially from point 253 to point 254. The workpiece may then be deposited at that point by release of the gripper assembly as in the previously described embodiments. The mechanism is then returned to its home position through the path 254, 253, 252 and 251.

It should be readily apparent that several material devices have been illustrated that offer a wide versatility of ranges of movement. Furthermore, due to the construction, a very rapid cycle of operation may be achieved and, where overload release devices are incorporated so as to prevent damage to the equipment. Various changes and modifications in addition to those already described, may be made without departing from the spirit and scope of this invention as defined by the appended claims.

What is claimed is:

1. A material handling device for moving a workpiece comprising gripping means for selectively gripping a workpiece to be moved, first supporting means for supporting movement along a first path, second supporting means for supporting said gripping means upon said first supporting means for movement relative thereto along a second path, a cam shaft supported for rotation, a barrel cam affixed for rotation with said cam shaft, a second cam affixed for rotation with said cam shaft, a first follower supported for oscillation about an axis disposed transversely to the axis of said camshaft and continuously engaged with said barrel cam for oscillation about said follower axis upon rotation of said camshaft, a second follower continuously engaged with said second cam and movable upon rotation of said cam shaft, first motion transfer means for transferring oscillation of said first follower about its axis into movement of said gripping means along the first path, and second motion transfer means for transferring movement of said second follower into movement of said gripping means along said second path.

2. A material handling device as contained in claim 1 wherein the second cam is also a barrel cam.

3. A material handling device as contained in claim 2 wherein the second follower means is supported for oscillation about an axis disposed transverse to the axis of the camshaft and parallel to the first follower axis.

4. A material handling device as contained in claim 3 wherein the movement of the gripping means in the first path is oscillatory movement about a first axis and the movement in the second path is reciprocatory movement about an axis parallel the axis of oscillation.

5. A material handling device as contained in claim 1 or 3 wherein the first supporting means comprises a carriage supported for movement by a housing, the second supporting means comprising rods slidably supported by said carriage for movement along the second path.

6. A material handling device as contained in claim 1 or claim 3 further including overload release means in one of the motion transfer means for permitting movement of the related cam without accompanying movement of the gripping means if the gripping means strikes an obstacle.

7. A material handling device as contained in claim 6 wherein the overload release means comprises a spring biased clutch.

8. A material handling device as contained in claim 7 wherein the first supporting means comprises a carriage supported for movement by a housing, the second supporting means comprising rods slidably supported by said carriage for movement along the second path.

* * * * *